United States Patent [19]

Obradovic

[11] Patent Number: 4,777,419
[45] Date of Patent: Oct. 11, 1988

[54] CONTROL APPARATUS AND METHOD FOR OPERATING A SWITCHED RELUCTANCE MOTOR

[75] Inventor: Ilija J. Obradovic, Belgrad, Yugoslavia

[73] Assignee: Emerson Electric Co., St. Louis, Mo.

[21] Appl. No.: 7,631

[22] Filed: Jan. 28, 1987

[51] Int. Cl.⁴ .............................................. H02P 8/00
[52] U.S. Cl. .................................... 318/696; 318/685; 318/254; 318/701; 318/138
[58] Field of Search ............... 318/696, 685, 254, 138, 318/701

[56] References Cited

U.S. PATENT DOCUMENTS

| | | | |
|---|---|---|---|
| 4,162,435 | 7/1979 | Wright | 318/138 |
| 4,250,544 | 2/1981 | Alley | 364/110 |
| 4,253,053 | 2/1981 | Roy et al. | 318/701 |

*Primary Examiner*—William M. Shoop, Jr.
*Assistant Examiner*—M. Bergmann
*Attorney, Agent, or Firm*—Polster, Polster and Lucchesi

[57] ABSTRACT

A switched reluctance motor is cyclically energized to operate at a desired speed. The energizing current is sampled at a predetermined time after the beginning of the cycle, the energizing current at that time being a function of rotor position. The sampled current value is compared with a reference to generate an error signal representative of the difference between the rotor position and the desired rotor position at the beginning of the cycle. The energization current is controlled in response to the error signal so as to correct the rotor position during the next cycle in the direction of the desired position. The energizing current is compared with the current limiting value derived from the error signal so that the current limiting value reflects the difference between the actual rotor position and the desired rotor position. The energizing current is limited to the current limiting value to correct the rotor position.

26 Claims, 3 Drawing Sheets

CONTROL APPARATUS AND METHOD FOR OPERATING A SWITCHED RELUCTANCE MOTOR

BACKGROUND OF THE INVENTION

This invention relates to switched reluctance machines and more particularly to control systems and methods for such machines not having rotor position sensors.

Switched reluctance motors are doubly salient motors, that is they have teeth on both the stator and the rotor. The stators of such motors have windings to form phases of the motor, but the rotor has no windings. The phases of the stator are energized sequentially in a cyclical fashion so that a magnetic force of attraction occurs between the energized stator pole and the rotating rotor. This current must be switched on and off at the proper times to provide the proper attraction between the rotor poles and the energized stator pole without producing a negative or braking attraction once the rotor reaches its aligned position with the stator. Because of the necessity of switching these phase energization currents on or off in synchronism with the rotary position of the rotor, it has been common in the past to utilize a shaft position sensor to determine the rotary position of the rotor. For example, optical shaft encoders have been used as such shaft position sensors. However, because the optical shaft encoders or other shaft position sensors require space in the motor and because of the necessity of running signal wires from the shaft position sensor to the control circuitry, shaft position sensors are not without their disadvantages in switched reluctance motors. This disadvantage has been overcome in the past by driving the switch reluctance motor in a way similar to a stepping motor. The motor is supplied with constant voltage from a direct current (DC) source with sequences of half-cycle rectangular voltage pulses applied appropriate to the phase number. The torque produced with a such a system is higher than needed. That is, there is a large torque margin, which is not economical for large units.

SUMMARY OF THE INVENTION

Among the various objects and features of the present invention may be noted the provision of a system and method for controlling the operation of a switched reluctance motor which accurately controls the application of energization current to the motor phases without a shaft position sensor.

Another object of the present invention is the provision of such a system and method which reduces the torque margin of the motor to improve the efficiency of energy conversion thereof.

Another object of the present invention is the provision of such a system and method which rapidly compensates for changes in the load driven by the motor.

A fourth object of the present invention is the provision of such a system and method which responds to increases in load more rapidly than it responds to decreases in load.

A fifth object of the present invention is the provision of such a system and method which rapidly responds to variations in load while maintaining control of rotor position at increased energy efficiency.

Other objects and features will be in part apparent and in part pointed out hereinafter.

Briefly, the method of the present invention of operating a switched reluctance machine includes the steps of cyclically energizing the phase windings of the machine to operate at a desired speed, and sampling the energizing current at a predetermined time after the beginning of a cycle. The energizing current at that time is a function of rotor position. The sampled current value is then compared with a reference to generate an error signal representative of the difference between the rotor position and a desired rotor position at the beginning of the cycle. The energization current is controlled in response to the error signal so as to correct the rotor position during the next cycle in the direction of the desired position.

In a second embodiment, the method of the present invention of operating a switched reluctance machine includes the steps of cyclically energizing the phase windings of machine to operate at the desired speed, and sampling the energizing current at a predetermined time after the beginning of the cycle. The energizing current a that time is a function of rotor position. The energizing current is compared with a current limiting value, which current limiting value is a function of the energizing current sample so that the current limiting value reflects the difference between actual rotor position and a desired rotor position. The energizing current is limited to the current limiting value to correct the rotor position.

The control apparatus of the present invention for a switched reluctance machine includes circuitry for cyclically energizing the phase windings of the machine to operate the machine at a desired speed. Circuitry is also provided for sampling the energizing current at a predetermined time after the beginning of a cycle, the energizing current at that time being a function of rotor position. Comparing circuitry is provided for comparing the sample current value with the reference to generate an error signal representative of the difference between the rotor position and a desired rotor position at the beginning of a cycle. The energizing circuitry includes circuitry for controlling the energization current in response to the error signal so as to correct the rotor position during the next cycle in the direction of the desired position.

In a second aspect, the control apparatus of the present invention for a switched reluctance machine includes circuitry for cyclically energizing the phase windings of the machine to operate the machine at the desired speed. Circuitry is also provided for sampling the energizing current at a predetermined time after the beginning of a cycle, the energizing current at that time being a function of rotor position. Circuitry responsive to the energizing current sample is provided for generating a current limiting value which is a function of the energizing current sample so that the current limiting value reflects the difference between the actual rotor position and the desired rotor position. The energizing circuitry includes circuitry for comparing the energizing current with the current limiting value and for limiting the energizing current to the current limiting value to correct rotor position.

A BRIEF DESCRIPTION OF THE DRAWINGS

Similar reference characters indicate similar parts throughout the several views of the drawings.

DESCRIPTION OF THE PREFERRED EMBODIMENT

Figure 1:
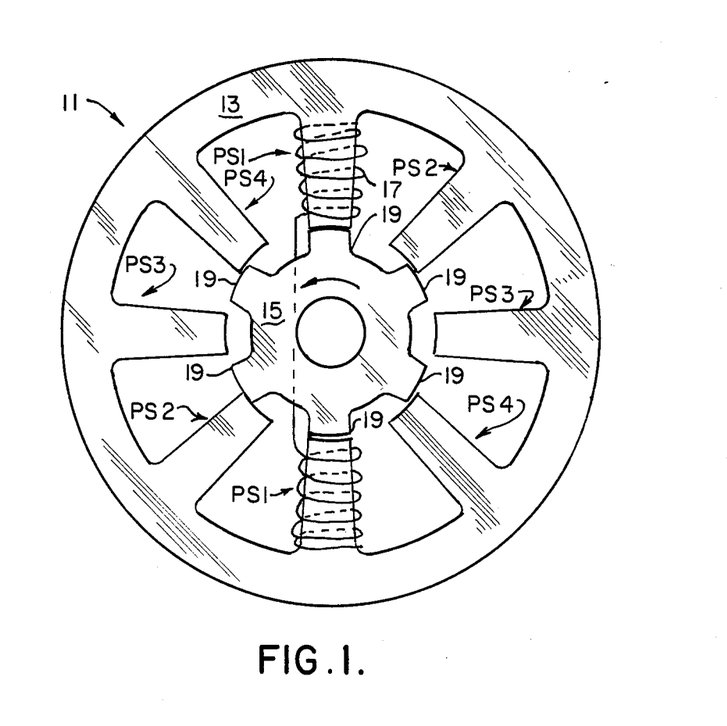
FIG. 1 is a schematic illustrating one mechanical structure of an electric motor with which the present invention may be used.
Figure 1A:
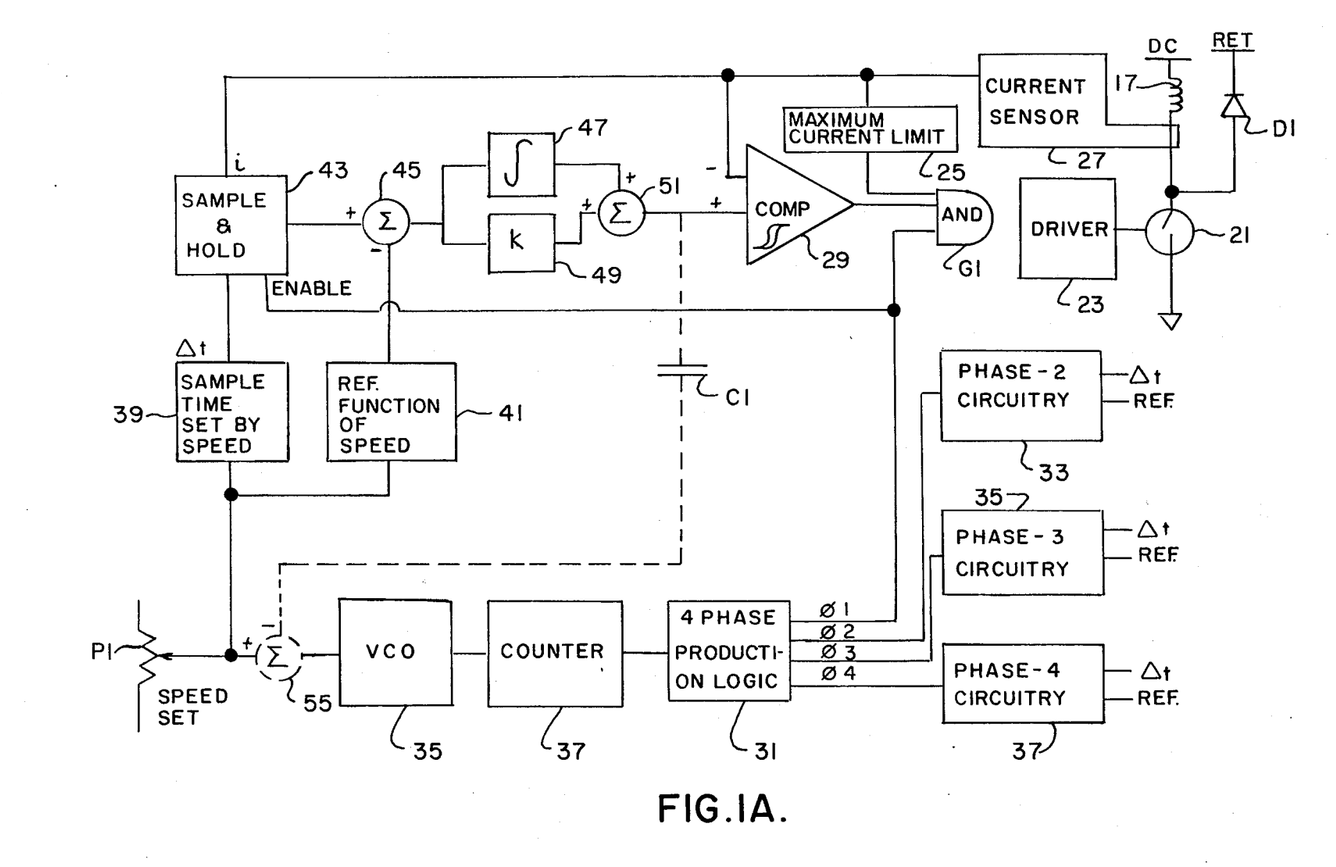
FIG. 1A is a block diagram illustrating the control circuitry of the present invention.

FIGS. 1 and 1A illustrate a switched reluctance motor 11 having a stator 13 and a rotor 15 and a control system therefor (FIG. 1A). Stator 13 is shown as an eight pole, four phase device having phases PS1, PS2, PS3 and PS4 as labeled. For clarity, only the winding 17 for the poles making up phase PS1, are shown in FIG. 1, although the other phases includes such windings as well.

Rotor 15 includes six poles or teeth labeled 19. Rotor 15 rotates in the cavity formed by stator 13 in response to the energization of the various phases of the stator. Energization of a phase such as phase PS1 causes the rotor to rotate to the position shown in FIG. 1 in which the closest rotor teeth or poles move to the minimum reluctance position shown. Once the rotor has reached this position, the corresponding phase windings are de-energized and the next phase is energized. In this case the phase PS2 would then be energized for counter-clockwise rotation.

Phase winding 17 (FIG. 1A), like the other phase windings not shown, is connected between a DC source and a switching element 21, which when closed connects the winding to ground. Switching element 21 is preferably a power transistor or the like. A diode D1 is connected between winding 17 and the switching element to provide for the return of power to the DC source (indicated by the label RET) when the switching element is not conducting current.

Switching element 21 is driven by a conventional driver circuit 23 which is under the control of an AND gate G1. The AND gate has three inputs. The topmost input of AND gate G1 is from a maximum current limit circuit 25 which causes that input on AND gate G1 to go Low when an absolute current maximum is exceeded in winding 17. This maximum current limit circuit 25 is connected between the AND gate and a current sensor 27 which has its sensing terminals connected between winding 17 and switching element 21. Thus the output of current sensor 27 is a direct measure of the actual current flowing through winding 17. When this current exceeds the maximum current limit set by circuit 25, the output of circuit 25 goes Low. The output of AND gate G1 thereupon goes Low causing switch element 21 to open. This circuit causes modulating of the energizing current in response to the maximum current limit to keep the energizing current no greater than that maximum current limit.

The middle input of AND gate G1 is connected to the output of a comparator 29 having suitable hysteresis. The inverting terminal of comparator 29 is connected to the output of current sensor 27. The noninverting input of comparator 29 is supplied with a signal which represents the current which it is desired to maintain in the motor during the then-existing load conditions. When the output of current sensor 27 exceeds this desired current, the current through winding 17 is too high and the output of comparator 29 goes Low. This disables AND gate G1, which causes switching element 21 to open. As the current in winding 17 falls below the desired value, as set by the hysteresis of comparator 29, the output of the comparator goes High again and switching element 21 is thereupon closed. This permits the circuit to be completed between the DC source through winding 17 and switching element 21 to ground, so that current again flows from the power source through the winding. Thus, comparator 29 causes the current through winding 17 to be chopped to maintain it at the desired level.

The third input of AND gate G1 is connected to the phase 1 output of a four phase production logic circuit 31 which controls the energization cycle of the various phases PS1 through PS4 of the motor 11. Circuit 31 also includes three other outputs for the other three phases of the motor connected to circuits labeled 33, 35 and 37 for energizing the respective phase windings of the PS2, PS3 and PS4 phases as indicated. The phase circuits 33, 35 and 37 are not shown in detail because they are identical to the circuits shown in FIG. 1A for phase PS1 of the motor. In fact, the circuits share many of the elements as shown in FIG. 1A for phase PS1, so that rotor position errors detected in one phase can be at least partially corrected in the next phase. Production logic circuit 31 is used to select for which phase is actually being used with these common circuit elements. However, for purposes of clarity of illustration this common use of the various elements of FIG. 1A in the circuits 33, 35 and 37 is not shown, although it would be apparent to those of ordinary skill in the art.

The speed of operation of motor 11 is set by a potentiometer P1 or similar device by means of which one can manually set the motor speed. The voltage read from the arm of potentiometer P1 is supplied to a voltage control oscillator 35 which is connected to a counter 37. The output of counter 37 is supplied to four phase production logic circuit 31 to enable it to supply the phase enable signals phi 1 through phi 4 at the proper rate to run the motor at the speed set by potentiometer P1.

The speed set signal is also supplied to a circuit 39 (whose output represents a time or time interval) and a reference circuit 41 whose output, like that of circuit 39, is a function of the speed set by potentiometer P1. The output of the sample time circuit 39 is supplied to a sample and hold circuit 43 which is connected to current sensor 27 and to the phase PS1 enable signal from production logic circuit 31.

Circuit 43 takes a sample of the current flowing through winding 17 at a predetermined time after the application of voltage to the winding as set by sample time circuit 39. The sample times are selected so that the current sample at that particular time after the application of voltage is representative of the rotary position of rotor 15 with respect to stator 13. The output of sample and hold circuit 13 is supplied to a summing junction 45 where it is compared to the reference from reference circuit 41. The reference circuit output represents the desired position of the rotor at the sample time. The output of summing junction 45 is thus an error signal representing the difference, in either direction, between the actual rotor position at the sample time and the desired rotor position at that time.

The error signal from summing junction 45 is supplied to an integrator 47, which integrates the error signal, and through a gain block 49 which generates a signal proportional to the error signal. In particular, for positive error signals, which indicate the need for increased current, gain block 49 generates a signal with a greater proportionality factor than for negative error signals. The reason for this difference in the output of gain block 49 is that motor 11 can rapidly fall out in the case of rapidly increasing torque requirements, while loss of control in the case of decreasing torque requirements is much less likely. The outputs from gain block 49 and integrator 47 are summed at a summing junction 51 whose output is the desired current signal supplied to the non-inverting input of comparator 29.

Figure 2:
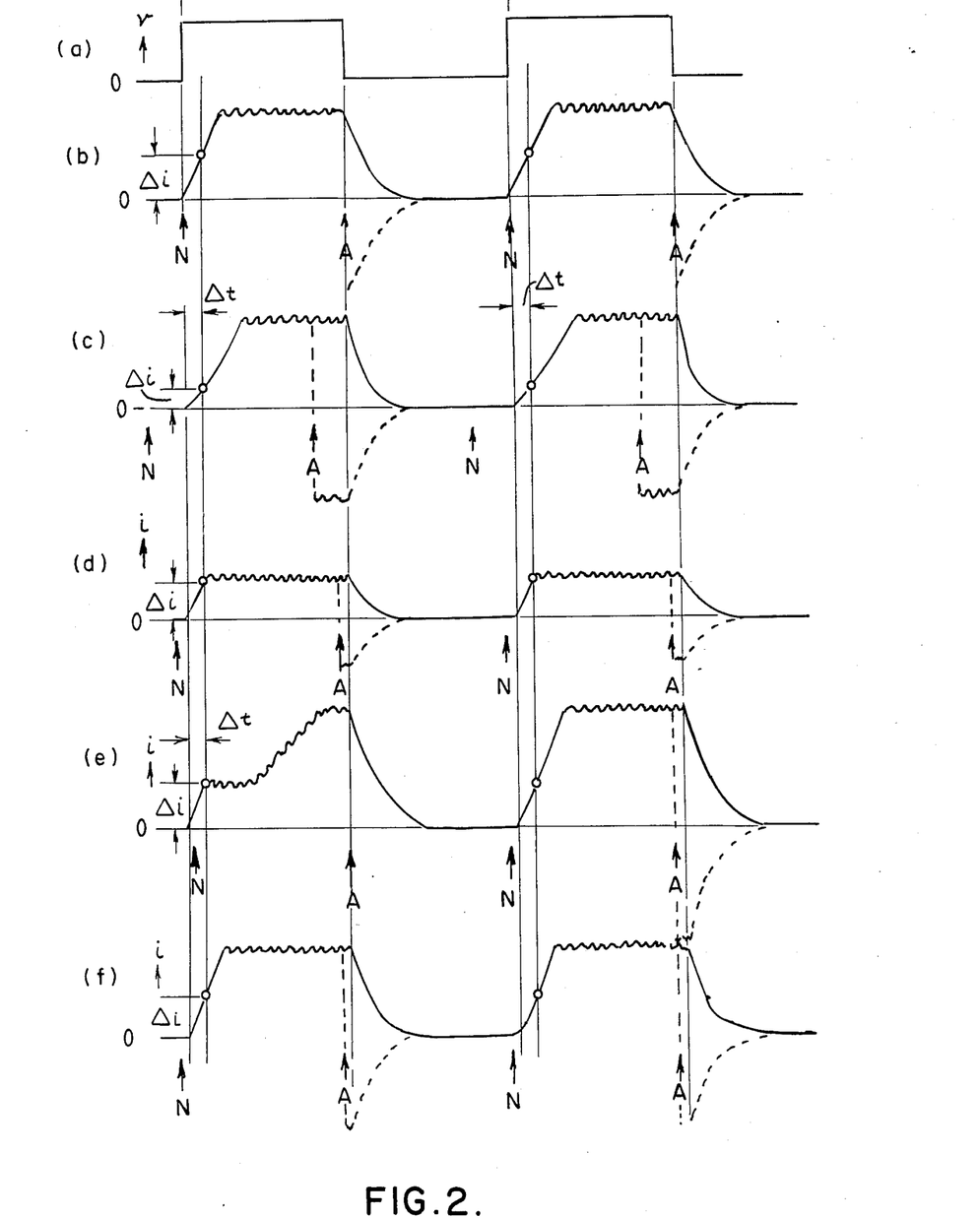
FIG. 2 is a graphical representation of the voltages and currents involved in the operation of the present invention.

From the above it can be seen that switched reluctance motor 11 is supplied with constant DC voltage in sequences of half cycle rectangular voltage pulses as shown in FIG. 2, line a. As also described above, the current through each of the windings is limited to its rated value by chopping. This rated or desired current value is variable and is chosen high enough for the motor to overcome the starting load torque and provide the desired acceleration.

After the desired speed under load torque is reached, rotor position relative to the voltage pulses is sensed by sample and hold circuit 43 and the current limiting value (the output of summing junction 51) is corrected as described below to improve the efficiency of energy conversion of motor 11.

The relative rotor position with respect to the voltage pulses is measured by sampling and holding the current value during the start of the current increase during a fixed time interval. This is illustrated in FIG. 2, line b where the fixed time interval is labeled delta t and the sampled current value labeled delta i is taken while the current through winding 17 is still rising. This is an indirect measurement of the inductance of the magnetic circuit. The relative rotor position with respect to the voltage pulses is established by a fixed time interval after the instant the voltage is switched on. More particularly, the sampled current value is proportional to the reciprocal of the inductance mean value for the magnetic circuit during the time interval delta t.

FIG. 2 illustrates not only these concepts described above, but also the control procedure as a function of time for one phase of motor 11. The voltage variation across winding 17 is shown in line a of FIG. 2. The frequency of these half cycle rectangular voltage variations is fixed as described above by potentiometer P1 whose setting represents the desired speed of the motor. If the switched reluctance motor were controlled by help of a rotor position sensor and the speed were slow, the switching on for winding 17 would coincide with the nonaligned rotor teeth position, i.e., the position in which two neighboring rotor teeth are the same distance from the stator tooth. This rotor position is denoted by N in FIG. 2, line b. In this case, the current increases up to its limiting value controlled in a closed loop by desired speed and load. After the rotor has reached its aligned position, labeled A in FIG. 2, line b, the coils are switched off and the current diminishes through diode D1, giving back the energy stored in the magnetic field through the DC source.

With the present invention, after the fixed time interval delta t shown in FIGS. 2, lines b through f (which fixed time interval is of course a function of speed), the current is sampled and the value delta i is held by sample and hold circuit 43. For the motor with a rotor position sensor, this is the optimal switching on instant. For the present invention without a rotor position sensor, this is the critical limiting value for a stable drive, and the load torque must be smaller than that produced corresponding to the current given in FIG. 2, line b.

When the load torque is reduced but the desired rotor current remains the same as that of line b, the rotor will advance and pass its nonaligned position before the voltage is switched off. This situation s illustrated in line c. Because the rotor has advanced in position, it now reaches its aligned position while the voltage is still being applied to the winding, as indicated by the letter A on line c and the motor works for a short time as a generator and gives electrical energy back to the energy source.

Figure 3:
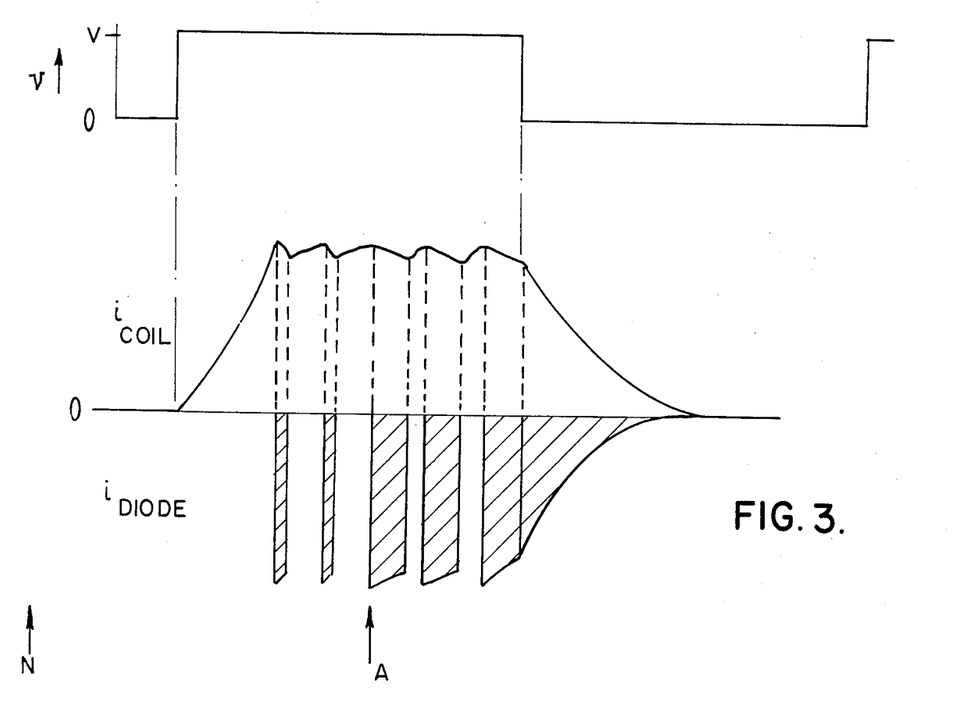
FIG. 3 is a graphical representation, on an enlarged scale, illustrating a porton of FIG. 2.

In examining the actual operation and energization of the windings, it will be seen that during the chopping periods, as illustrated in more detail in FIG. 3, the motor works alternately as a motor and as a generator. Up to the aligned rotor position, motor 11 works more as a motor and after the aligned rotor position it works more as a generator. In FIG. 3, which corresponds to the current variations given in FIG. 2, line c, the real energy flow during chopping is shown in detail. The current in winding 17 is given by the solid lines and the current flow through diode D1 is given by the dashed lines and the cross-hatching. Up to aligned rotor position A, the intervals during which the motor works as a generator are shorter than the intervals during which it works as a motor. After the rotor has passed its aligned position, it works more as a generator than as a motor.

The energy conversion under such conditions is with low efficiency, because the copper losses are the same as in the situation given in FIG. 2, line b, but the converted energy is smaller. In this case, the smaller load torque has changed the rotor position during the switching on instant to that labelled N on line c and the inductance in the magnetic circuit is increased. Therefore, the sampled current value delta i after the same time interval delta t decreases, as can be seen in FIG. 2, line c.

With the present invention, however, the situation of FIG. 2, line c is corrected so that the curve of line d results. This occurs because when the sampled current delta i falls below the reference as has occured in line c, the output of summing junction 45 goes negative. This negative output causes the output of gain block 49 to decrease a small amount due to the small proportionality constant for negative signals and also slowly causes the output of integrator 47 to decrease. Both these factors cause the output of summing junction 51, which represents the desired motor current to slowly decrease. This process may continue until the sampled current value delta i increases closely to the limiting value as set by the output of summing junction 51. Line d illustrates the rotor position current changes for this corrected situation. Note that the nonaligned position N and the aligned position A in line d are much closer to their desired values than shown in line c. As a result, the operation after the correction of circuitry of FIG. 1A results in a considerable increase in the efficiency of the motor. The load torque is the same but the copper losses are reduced and only a small amount of energy is generated at the cycle end in line d.

Operation of the circuit of FIG. 1A in the event of a overload is illustrated in line e. In the case of a overload, the rotating mass of the rotor takes up some of the increase in torque, but the rotor position relative to the stator at the switching on instant approaches the nonaligned position and perhaps crosses it as shown in line e. The sampled current value delta i in this situation reaches the critical value. According to the invention the desired current value, the output of summing junction 51, must be increased as fast as possible. This occurs because of the larger proportionality factor of gain block 49 for positive signals. As can be appreciated, the sampled current delta i in line e is larger than the reference because of the position of the rotor at the instant the voltage is applied. This positive signal is amplified by gain block 49, thereby rapidly increasing the output of summing junction 51. Although the change in load torque can happen rapidly, the rotating mass of the rotor is always sufficiently high to give time for the electronics of FIG. 1A to intervene. Moreover, the energy conversion cycles happen many times during only one rotor revolution. That is, the desired winding current, which is the output of summing junction 51, is increased not once each cycle, but rather once for each phase. Therefore, the sampled current value and the desired motor current value are both increased rapidly.

In the cases of rapid torque increases, the stability of motor 11 can be insured if at the same time the correction of line e is taking place, the frequency of the voltage pulses of line a is diminished slightly. In such cases, the relative rotor position at the switching on instant can come over its nonaligned position and after some cycles can be brought back into the stable position as given in line e. Such an optional circuit is illustrated in FIG. 1A and includes a capacitor C1 connected to the output of summing junction 51 and an additional summing junction 55 having as one input the signal through capacitor C1. The other input to summing junction 55 is the speed set signal from potentiometer P1. When the output from summing junction 51 increases rapidly, a current pulse is passed through capacitor C1. This pulse is subtracted from the output of speed setting potentiometer P1 to give a lower voltage signal to voltage controlled oscillator (VCO) 35, thereby causing the momentary slight reduction in the frequency of the voltage pulses.

Once the rotor position has stabilized, the possible torque production is too high for the desired load torque and a slow correction of rotor position must be taken. The new energy conversion corresponding to current variation is shown in line f on FIG. 2.

If the desired speed of motor 11 is higher, it is necessary to change the time interval delta t. This is because when the frequency of the voltage pulses is increased, optimal energy conversion can be realized only if the switching on instant happens before the rotor teeth have reached their nonaligned positions. The inductance of the magnetic circuit increases, and to receive reliable sampled current values, the time interval delta t must be increased with increasing speed. Thus delta t is shown to be a function of the desired speed as set by potentiometer P1.

In view of the above, it will be seen that the various objects and features of the present invention are achieved and other advantageous results are obtained. As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of operating a switched reluctance machine having stator phase windings and a rotor comprising:
   cyclically energizing the phase windings to operate the machine at a desired speed;
   sampling the energizing current at a predetermined time after the beginning of a cycle, the energizing current at that time being a function of rotor position;
   comparing the sampled current value with a reference to generate an error signal representative of the difference between the rotor position and a desired rotor position at the beginning of a cycle;
   controlling the energization current in response to the error signal so as to correct the rotor position during the next cycle in the direction of the desired position.

2. The method as set forth in claim 1 when the machine has a plurality of phases, each phase having a cycle, said sampling, comparing and controlling steps occuring for each phase so that an error signal generated in the cycle of one phase is at least partially corrected for in the energization of the next phase.

3. A method of operating a switched reluctance machine having stator phase windings and a rotor comprising:
   cyclically energizing the phase windings to operate the machine at a desired speed;
   sampling the energizing current at a predetermined time after the beginning of a cycle, the energizing current at that time being a function of rotor position;
   comparing the sampled current value with a reference to generate an error signal representative of the difference between the rotor position and a desired rotor position at the beginning of a cycle;
   controlling the energization current in response to the error signal so as to correct the rotor position during the next cycle in the direction of the desired position;
   said controlling step including deriving a control signal from the error signal, said control signal being a function or the error signal and its integral.

4. The method as set forth in claim 3 wherein the control signal is the sum of a signal proportional to the error signal and a signal representative of the integral of the error signal.

5. The method as set forth in claim 4 wherein the signal proportional to the error signal has a greater proportionality factor for positive values of the error signal than for negative values of the error signal, so that energization current is increased faster under increased load conditions than it is decreased under decreased load conditions.

6. A method of operating a switched reluctance machine having stator phase windings and a rotor comprising:
   cyclically energizing the phase windings to operate the rotor at a desired speed;
   sampling the energizing current at a predetermined time after the beginning of a cycle, the energizing current at that time being a function of rotor position;
   comparing the energizing current with a current limiting value, said current limitng value being a function of the energizing current sample, so that the current limiting value reflects the difference between the actual rotor position and a desired rotor position; and
   limiting the energizing current to the current limiting value to correct the rotor position.

7. The method as set forth in claim 6 wherein the machine has a plurality of phases energized in turn, each phase having a cycle, said sampling, comparing and limiting steps occuring for each phase so that the current limiting value resulting from a current sample from one phase is used in limitng the energizing current for the next phase.

8. A method of operating a switched reluctance machine having stator phase windings and a rotor comprising:
cyclically energizing the phase windings to operate the rotor at a desired speed;
sampling the energizing current at a predetermined time after the beginning of a cycle, the energizing current at that time being a function of rotor position;
comparing the energizing current with a current limiting value, said current limiting value being a function of the energizing current sample, so that the current limiting value reflects the difference between the actual rotor position and a desired rotor position;
limiting the energizing current to the current limiting value to correct the rotor position; and
comparing the sampled current value to a reference to obtain an error signal, said current limiting value being a function of the error signal and its integral.

9. The method as set forth in claim 8 wherein the reference is a function of desired machine speed.

10. The method as set forth in claim 8 wherein the current limiting value is the sum of a signal proportional to the error signal and a signal representative of the integral of the error signal.

11. The method as set forth in claim 10 wherein the signal proportional to the error signal has a greater proportionality factor for positive values of the error signal than for negative values of the error signal, so that energization current is increased faster under increased load conditions than it is decreased under decreased load conditions.

12. Control apparatus for a switched reluctance machine having stator phase windings and a rotor comprising:
means for cyclically energizing the phase windings to operate the machine at a desired speed;
means for sampling the energizing current at a predetermined time after the beginning of a cycle, the energizing current at that time being a function of rotor position;
means for comparing the sampled current value with a reference to generate an error signal representative of the difference between the rotor position and a desired rotor position at the beginning of a cycle;
said energizing means including means for controlling the energization current in response to the error signal so as to correct the rotor position during the next cycle in the direction of the desired position.

13. The control apparatus as set forth in claim 12 wherein the machine has a plurality of phases, the energizing means including means for cyclically selecting the phase to be energized and controlling the length of time the phase is energized, said sampling means being responsive to the initiation of energization of a phase to sample the current in that phase the predetermined time after the initiation of energization.

14. The control apparatus as set forth in claim 12 further including means for setting the desired speed of operation of the machine and means responsive to the speed setting means for setting the predetermined time and the reference.

15. Control apparatus for a switched reluctance machine having stator phase windings and a rotor comprising:
means for cyclically energizing the phase windings to operate the machine at a desired speed;
means for sampling the energizing current at a predetermined time after the beginning of a cycle, the energizing current at that time being a function of rotor position;
means for comparing the sampled current value with a reference to generate an error signal representative of the difference between the rotor position and a desired rotor position at the beginning of a cycle;
said energizing means including means for controlling the energization current in response to the error signal so as to correct the rotor position during the next cycle in the direction of the desired position;
said controlling means including means responsive to the error signal for generating a first control signal proportional to the error signal, the first control signal means generating a signal with a first factor of proportionality for error signals indicative of increased loads and generating a signal with a second, smaller, factor of proportionality for error signals indicative of decreased loads.

16. Control apparatus for a switched reluctance machine having stator phase windings and a rotor comprising:
means for cylindrically energizing the phase windings to operate the machine at a desired speed;
means for sampling the energizing current at a predetermined time after the beginning of a cycle, the energizing current at that time being a function of rotor position;
means for comparing the sampled current value with a reference to generate an error signal representative of the difference between the rotor position and a desired rotor position at the beginning of a cycle;
said energizing means including means for controlling the energization current in response to the error signal so as to correct the rotor position during the next cycle in the direction of the desired position;
said controlling means including means responsive to the error signal for increasing the energization current in responsive to an error signal representative of an increased load at a first rate and for decreasing the energization current in response to an error signal representative of a decreased load at a second rate, the first rate being greater than the second rate.

17. Control apparatus for a switched reluctance machine having stator phase windings and a rotor comprising:
means for cylindrically energizing the phase windings to operate the machine at a desired speed;
means for sampling the energizing current at a predetermined time after the beginning of a cycle, the energizing current at that time being a function of rotor position;
means for comparing the sampled current value with a reference to generate an error signal representative of the difference between the rotor position and a desired rotor position at the beginning of a cycle;

said energizing means including means for controlling the energization current in response to the error signal so as to correct the rotor position during the next cycle in the direction of the desired position;

said controlling means including means for generating a current limiting value from the error signal, the current limiting value being a function of the error signal and its integral.

18. The control apparatus as set forth in claim 17 wherein the controlling means further includes means for modulating the energizing current in response to the current limiting value to keep the energizing current no greater than the current limiting value.

19. Control apparatus for a switched reluctance machine having stator phase windings and a rotor comprising:

means for cyclically energizing the phase windings to operate the machine at a desired speed;

means for sampling the energizing current at a predetermined time after the beginning of a cycle, the energizing current at that time being a function of rotor position;

means for comparing the sampled current value with a reference to generate an error signal representative of the difference between the rotor position and a desired rotor position at the beginning of a cycle;

said energizing means including means for controlling the energization current in response to the error signal so as to correct the rotor position during the next cycle in the direction of the desired position; and means responsive to a sudden increase in load for reducing the rate of the cyclical energization of the phase windings for a relatively short length of time.

20. Control apparatus for a switched reluctance machine having stator phase windings and a rotor comprising:

means for cyclically energizing the phase windings to operate the machine at a desired speed;

means for sampling the energizing current at a predetermined time after the beginning of a cycle, the energizing current at that time being a function of rotor position;

means responsive to the energizing current sample for generating a current limiting value which is a function of the energizing current sample so that the current limiting value reflects the difference between the actual rotor position and a desired rotor position;

said energizing means including means for comparing the energizing current with the current limiting value and for limiting the energizing current to the current limiting value to correct the rotor position.

21. Control apparatus for a switched reluctance machine having stator phase windings and a rotor comprising:

means for cyclically energizing the phase windings to operate the machine at a desired speed;

means for sampling the energizing current at a predetermined time after the beginning of a cycle, the energizing current at that time being a function of rotor position;

means responsive to the energizing current sample for generating a current limiting value which is a function of the energizing current sample so that the current limiting value reflects the difference between the actual rotor position and a desired rotor position;

said energizing means including means for comparing the energizing current with the current limiting value and for limiting the energizing current to the current limiting value to correct the rotor positon;

said current limiting value generating means including means for comparing the sampled current value to a reference to obtain an error signal, said current limiting value being a function of the error signal and its integral.

22. The control apparatus as set forth in claim 21 further including means for setting the desired speed of the machine and means responsive to the speed setting means for setting the reference.

23. The control apparatus as set forth in claim 21 wherein the current limiting value generating means includes means for summing a signal proportional to the error signal and a signal representative of the integral of the error signal.

24. The control apparatus as set forth in claim 20 wherein the machine has a plurality of phases, the energizing means including means for cyclically selecting the phase to be energized and controlling the length of time the phase is energized, said sampling means being responsive to the initiation of energization of a phase to sample the current in that phase the predetermined time after the initiation of energization.

25. Control apparatus for a switched reluctance machine having stator phase windings and a rotor comprising:

means for cyclically energizing the phase windings to operate the machine at a desired speed;

means for sampling the energizing current at a predetermined time after the beginning of a cycle, the energizing current at that time being a function of rotor position;

means responsive to the energizing current sample for generating a current limiting value which is a function of the energizing current sample so that the current limiting value reflects the difference between the actual rotor position and a desired rotor position;

said energizing means including means for comparing the energizing current with the current limiting value and for limiting the energizing current to the current limiting value to correct the rotor position;

said current limiting value generating means including means for comparing the sampled current value to a reference to obtain an error signal and means responsive to the error signal for increasing the current limiting value in response to an error signal representative of an increased load at a first rate and for decreasing the current limiting value in response to an error signal representative of a decreased load at a second rate, the first rate being greater than the second rate.

26. Control apparatus for a switched reluctance machine having stator phase windings and a rotor comprising:

means for cyclically energizing the phase windings to operate the machine at a desired speed;

means for sampling the energizing current at a predetermined time after the beginning of a cycle, the energizing current at that time being a function of rotor position;

means responsive to the energizing current sample for generating current limiting value which is a function of the energizing current sample so that the current limiting value reflects the difference between the actual rotor position and a desired rotor position;

said energizing means including means for comparing the energizing current with the current limiting value and for limiting the energizing current to the current limiting value to correct the rotor position; and means responsive to a sudden increase in load for reducing the rate of the cyclical energization of the phase windings for a relatively short length of time.

* * * * *